United States Patent [19]

Christopher

[11] Patent Number: 5,180,959
[45] Date of Patent: Jan. 19, 1993

[54] ELECTRICALLY CONTROLLED SHIFT ACTUATOR

[75] Inventor: Gary L. Christopher, Fox River Grove, Ill.

[73] Assignee: Eaton Corporation, Cleveland, Ohio

[21] Appl. No.: 742,790

[22] Filed: Aug. 8, 1991

[51] Int. Cl.[5] .............................. B60K 20/02
[52] U.S. Cl. ............................. 318/626; 318/266; 318/286; 318/468; 318/561; 74/473 R
[58] Field of Search .............. 318/626, 671, 10, 11, 318/12, 15, 256, 264, 265, 266, 286, 293, 466, 467, 468, 561; 74/110, 335, 469, 473 R; 192/3.51, 4 R

[56] References Cited

U.S. PATENT DOCUMENTS

| | | | |
|---|---|---|---|
| 2,754,692 | 7/1956 | Russell | 74/473 |
| 2,821,089 | 1/1958 | Russell | 74/335 |
| 3,358,517 | 12/1967 | Nelson et al. | 74/110 |
| 3,732,475 | 5/1973 | Geerling | 318/275 |
| 3,774,091 | 11/1973 | Kearns | 318/DIG. 2 |
| 3,919,611 | 11/1975 | Takahashi et al. | 318/380 |
| 4,015,179 | 3/1977 | Endo | 318/275 |
| 4,042,896 | 8/1977 | Powell et al. | 335/17 |
| 4,329,096 | 5/1982 | Herscovici | 409/15 |
| 4,428,248 | 1/1984 | Broucksou et al. | 74/335 |
| 4,550,625 | 11/1985 | Martin et al. | 74/335 |
| 4,663,721 | 5/1987 | Herscovici | 409/475 |
| 4,887,702 | 12/1989 | Ratke et al. | 192/4 A |

Primary Examiner—Bentsu Ro
Attorney, Agent, or Firm—L. G. Vande Zande

[57] ABSTRACT

An electrically controlled shift actuator (2) of the type having a rotatable worm gear wheel (22) driven by a motor (M) to a predetermined one of at least two rotational positions, the wheel having an eccentric drive pin (26) moving a reaction member (14) to preload a spring-charged (10) shift member engagement means comprising a slide (6) and ball (8) directly engaged with a shift member (16) to move a shift member to a predetermined one of at least two positions. The control includes a selector switch (36), a pair of position sensing switches (28,30), and an electrically controlled switch (62) for alternatively connecting the motor (M) to a power supply (38) or to a dynamic braking circuit (66–68), but never to both simultaneously.

10 Claims, 2 Drawing Sheets

ELECTRICALLY CONTROLLED SHIFT ACTUATOR

BACKGROUND OF THE INVENTION

This invention relates generally to an electrically controlled shift actuator and an electrical control system therefor and more particularly to a shift actuator, preferably a gear shift actuator for an axle, of the type utilizing a rotatable member to position a shift member engagement means at one of two shift positions to effect the shift thereat or to preload the shift member engagement means for shifting thereof to a selective one of two selectable operating positions sufficiently to effect the shift on the occurrence of an event enabling the shift to occur.

Shift actuators, such as two-position shift actuators, for selectively shifting or positioning a shifting member, such as a shift fork or the like, are well known in the prior art. Shift actuators allowing a shift to each of at least two preselected positions by preloading an element, usually a resilient element such as spring, to bias the shift member, usually a shift fork or the like, towards each of the two preselected positions are also well known in the art. Examples of the latter devices are disclosed respectively in U.S. Pat. Nos. 2,754,692; 2,821,089 and 3,358,517, the disclosures of which are incorporated herein by reference.

The present invention relates to the control of shift actuators of the type utilizing a rotatable member for moving a shift member engagement means between at least two spaced-apart shift positions including the shift actuator disclosed in U.S. Pat. No. 4,428,248 issued Jan. 31, 1984, and assigned to the assignee of the present invention, the disclosure of which is included herein by reference. More particularly, the present invention relates to an electrical control of shift actuators of the aforementioned type which employ a selector switch for selectively connecting one of two position sensing switches to a power supply for connecting a drive motor for the rotatable member to the power supply through the respective position sensing switch, and means associated with said rotatable member for operating said position sensing switch in a prescribed sequence for disconnecting the motor from the power supply and connecting a dynamic braking energy dissipation means in circuit with the motor when the rotatable member reaches a predetermined rotational position such as is disclosed in U.S. Pat. No. 4,550,625 issued Nov. 5, 1985, and assigned to the assignee of the present invention, the disclosure of which is included herein by reference.

Although shifting actuators of the type utilizing an electrical control for connecting a dynamic braking energy dissipation circuit to the drive motor have been generally satisfactory, such control energizes the drive motor while the dynamic braking circuit is still temporarily connected to the motor, thereby drawing heavy start-up current through switch contacts. A large resistor may be included in the dynamic braking circuit to substantially match the motor armature resistance, thereby reducing current in the start-up condition, but this reduces the dynamic braking efficiency as well. The exposure of heavy start-up currents to contacts in switches of the type used for detecting or sensing the position of the shift mechanism accelerate erosion of the switch contacts and shorten switch life. Induction energy stored in the motor is manifested as arcing across the contacts of a position sensing switch when first opened to remove power from the motor, such arcing producing an undesirable EMI noise level.

SUMMARY OF THE INVENTION

In accordance with the present invention, an electric control for a shift actuator is provided wherein electrically energizable switch means are incorporated in the energy dissipating dynamic braking circuit to selectively connect and disconnect that circuit with the motor. The electrically energizable switch means is controlled by an arrangement of selector switch and position sensing switches so as to prevent application of power to the motor and the dynamic braking circuit simultaneously. This control is provided in a shift actuator preferably, but not limited to, a two-position shift actuator, allowing preselection of a shift and preloading of a shift member engagement means to effect shifting to one of at least two selectable shift positions in a swift and positive manner.

The foregoing features and advantages of the present invention will become more readily apparent when reading the following description of the preferred embodiments taken in conjunction with the accompanying drawings.

DESCRIPTION OF THE PREFERRED EMBODIMENTS

Figure 1:
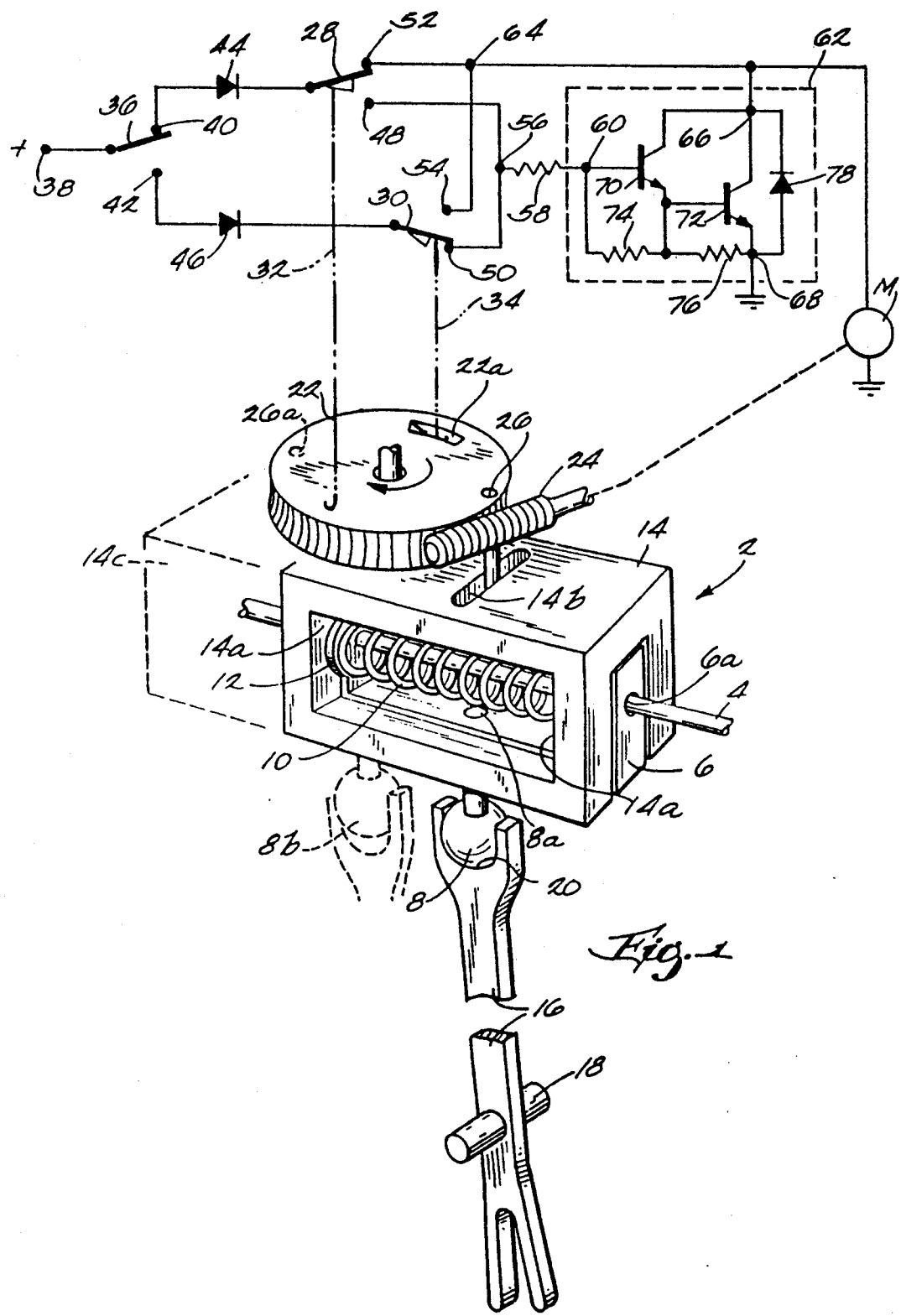
FIG. 1 is a schematic view of a two-position shift actuator moved between shift positions by a motor-driven rotatable member and an electric control for such actuator constructed in accordance with this invention.

FIG. 1 shows an embodiment of the electrically controlled shift actuator 2 of this invention in schematic form. A housing that encloses the shift actuator elements and the electric control and that mounts the motor thereon has been omitted in the drawings for purposes of clarity, although it is to be understood that the various elements are suitably mounted and guided for movement in such a housing. The shift actuator 2 comprises a slide shaft 4 which is fixedly supported at its opposite ends within the housing. An elongated U-shaped slide member 6 is slidably disposed on shaft 4 by holes 6a (only one shown) in the vertical legs of the U-shaped member 6 which slidably receive the shaft therethrough. Slide member 6 is free to slide in opposite axial directions along slide shaft 4. A shift member engagement means in the form of a spherical ball 8 is part of slide 6, depending from the center of the bight portion of the slide. Ball 8 is shown attached to slide 6 by a pin 8a, but could be made integrally with the slide. Resilient biasing means 10, preferably in the form of at least one coil spring, is disposed coaxially about shaft 4 and is supported at its opposite ends by spring seats 12 or the like (only one of which is shown) which bear against the inner faces of the upstanding legs of U-shaped slide 6. The diameter of spring seats 12 is greater than the transverse width of slide 6 so that the spring seats 12 project beyond the lateral edges of the upstanding legs of the slide 6. A reaction member 14 is also slidably disposed within the housing of the shift actuator. Reaction member 14 comprises a generally rectangular member having a slot open to the bottom thereof running end-to-end of the reaction member in which slide 6 is disposed. The sides of reaction member 14 are open to provide end wall surfaces 14a adjacent the upstanding legs of slide member 6, the wall surfaces 14a being engaged by the overhanging portions of spring seats 12. Slide 6 and reaction member 14 are slidably movable relative to each other along shaft 4, such relative movement causing compression of spring 10. A shift member 16 is pivotally mounted at pivot 18 and has an arcuate shaped open end 20 that is adapted to enclose at least a portion of spherical ball 8 to rotate shift member 16 about pivot 18 such as when ball 8 moves to the dotted line position 8b indicating a second shift position of the actuator.

A worm gear wheel 22 is journaled for rotation to the aforementioned housing (not shown) and is rotatably driven by a worm gear 24 which in turn is driven by a motor M. The motor may be arranged to drive the worm gear 24 directly or, if desired, through a speed change gear box (not shown). Rotatable wheel 22 has an eccentric drive pin 26 depending therefrom and extending into a transverse slot 14b in reaction member 14. Rotation of wheel 22 causes pin 26 to rotate about the axis of the wheel and move reaction member 14 in opposite axial directions parallel to shaft 4 depending upon the rotational position of pin 26. As viewed in the drawing, pin 26 is shown in solid lines at the right-hand, first rotational position of wheel 22. Rotational movement of wheel 22 180° will cause pin 26 to occupy the dotted line, left-hand, second rotational position shown at 26a. In so doing, pin 26 drives reaction member 14 leftward to the dotted line second position indicated at 14c. Actual shifting of the axle does not occur until a clutch is engaged or torque is otherwise removed from a driven member The shift member 16 holds slide member 6 in the right-hand (solid line) position as viewed in FIG. 1. Accordingly, movement of reaction member 14 by wheel 22 and pin 26 relative to slide 6 causes compression of spring 10 between a right-hand spring seat 12 which moves with reaction member 14 and a left-hand spring seat 12 which remains stationary against an inner surface of an upstanding leg of slide 6. When the clutch is engaged or torque is removed from the axle, shift member 16 is released and spring 10 drives slide 6 quickly and positively to the second shift position as shown in dotted lines at ball position 8b. Although only two shift positions have been shown, it is contemplated that additional intermediate shift positions can be obtained by appropriate rotational positions of the rotatable member 22.

A pair of position sensing switches 28 and 30 are provided for determining the rotational position of rotatable member 22. The switches 28 and 30 may preferably be a pair of self-contained miniature double-throw snap action switches which are mounted in the shift actuator housing and have depressible actuators biased toward the face of wheel 22 although other position sensing switches such as, but not limited to, magnetic reed switches, or proximity switches may also be used. A switch operating structure such as a cam or the like is associated with the wheel 22 for operating the position sensing switches 28 and 30. By way of example, the surface of wheel 22 is provided with a slot 22a formed in the face of the wheel. The trailing ends of the slot comprises a ramp leading to the surface of the wheel. Cam follower pins, represented in the drawing by dot-dash lines 32 and 34, respectively, are slidably mounted in the shift actuator housing in alignment with the respective depressible actuators of the switches. With reference to FIG. 1, switches 28 and 30 are biased to a first condition such as that of switch 30 and are operated by the upper surface of wheel 22 to a second condition such as that of switch 28.

The electrical control system for the shift actuator 2 is diagrammatically shown in the upper portion of FIG. 1. A two-position selector switch 36 is positioned in the cab of the vehicle or other apparatus in which the shift mechanism is employed for manual operation by the vehicle operator. A common terminal of selector switch 36 is connected to a DC power supply such as positive terminal 38. A first output terminal 40 of selector switch 36 is connected to a common terminal of position sensing switch 28 through a diode 44 poled to block current flow in the direction from switch 28 to terminal 38. A second output terminal 42 of selector switch 36 is connected to a common terminal of position sensing switch 30 through a diode 46 poled to block current flow in the direction from switch 30 to terminal 38. First condition output terminals 48 and 50 of switches 28 and 30, respectively, are connected together at common point 56 which in turn is connected to the gate 60 of a Darlington transistor 62 through a current limiting resistor 58. The second condition output terminals 52 and 54 of switches 28 and 30, respectively, are connected together at common point 64 to a collector 66 of Darlington transistor 62. The emitter 68 of Darlington transistor 62 is connected to ground. Motor M is connected to common point 64 and to ground in parallel with the collector-emitter circuit 66-68 of Darlington transistor 62.

Darlington transistor 62 is a well known three-terminal transistor device comprising a pair of NPN transistors 70 and 72 connected in an emitter-to-base arrangement. A resistor 74 is connected across the base and emitter of transistor 70, and a resistor 76 is connected across the base and emitter of transistor 72. These elements are packaged on a single chip. A diode 78 is shown in the diagram of the Darlington transistor 62, poled to block current in a positive-to-ground direction. The diode function is incorporated in the Darlington chip as a protection device for the Darlington transistor. However, the diode function is important to this invention for reducing EMI noise emissions and should be included if another type of switch is used in place of the Darlington transistor 62. Other switches contemplated are a conventional bipolar junction transistor, a field effect transistor or, although much slower, a silicon controlled rectifier. The Darlington transistor 62 is preferred because it has very quick response time, requires less base to emitter current and has high gain. The diode affect operates as a fly-back diode for the motor in the brief interim period between power supply interruption and the motor acting as a generator during dynamic braking, allowing motor current to continue to flow in the original direction until the inductive current is dissipated, thereby preventing arcing at the opened contacts of switches 28 or 30 when disconnecting power from the motor. It is such arcing that creates undesirable noise levels (EMI) for the device.

Slot 22a and the upper surface of wheel 22 provide means for changing the condition of the position sensing switches 28 and 30 as is hereinafter more fully described with respect to FIGS. 2A-2C, 3A-3C. It can be seen in FIG. 1 that as wheel 22 is rotated by worm gear 24, pin 26 moves the shift member engagement means 8 between the first and second shift positions by means of a reaction member 14, spring 10, spring seats 12 and slide member 6, as previously described. Clockwise movement of wheel 22 moves the slot 22a relative to the cam follower pins 32 and 34, respectively, to move the pins upward or downward through respective openings (not shown) in the wall of the housing to operate the snap action switches 28 and 30. The cam of slot 22a may be an integral part of the worm gear wheel 22 or may be included as an additional member made to rotate in correspondence with the wheel. Alternatively, other means may be employed to change the condition of the position sensing switch means.

Figure 2A:
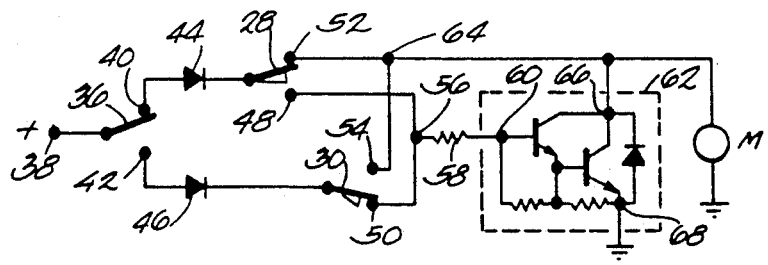
FIGS. 2A-2C are schematic views showing sequential switch operations associated with the control of the shift actuator of the invention in moving the shift member engagement means to a second shift position.
Figure 2B:
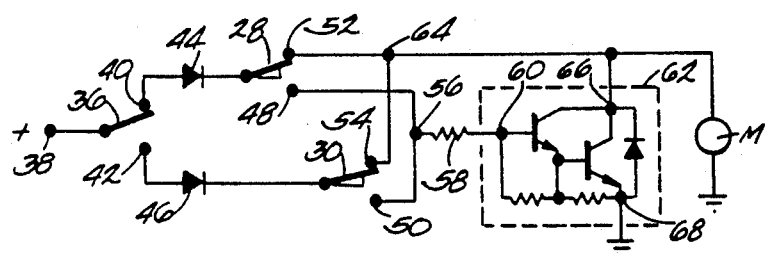
Figure 2C:
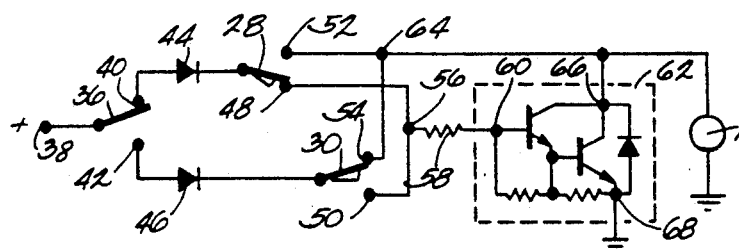

FIGS. 2A-2C and 3A-3C show the sequential operation of the control means for the shift actuator of this invention. In FIGS. 2A-2C, selector switch means 36 is manually operated to the first condition thereof, completing a circuit to the output terminal 40 and to position sensing switch 28. As seen in FIGS. 1 and 2A, pin 32 rests on the upper surface of wheel 22 to operate position sensing switch 28 to its second condition, completing a circuit to output terminal 52 thereof and connecting power from the positive terminal 38 to the motor M to start rotation of the motor, driving reaction member 14 toward the left as viewed in FIG. 1. The initial increment of rotary movement of wheel 22 moves slot 22a clockwise to cause the ramped surface thereof to drive cam follower pin 34 upward and operate position sensing switch 30 to its second condition as shown in FIG. 2B. This switch operation has no affect on the running motor M inasmuch as no power is applied to terminal 42 of selector switch 36 or to the switch 30. When the wheel 22 is driven through a 180° revolution to bring the drive pin 26 to its second position 26a and reaction member 14 is at the second position 14c thereof, slot 22a moves under cam follower pin 32 allowing the latter to drop into the opening of slot 22a, releasing position sensing switch 28 to move to its first condition, thereby opening the circuit to motor M to turn off the motor. Stored energy in motor M would normally cause arcing of these open contacts of switch 28, but the clamping diode 78 provides the necessary path to permit motor current to flow, preventing EMI producing arcing at switch 28. In the first condition, switch 28 completes a circuit from positive terminal 38 through selector switch 36, the output terminal 40 thereof, diode 44, and switch 28 through first condition output terminal 48 to the gate 60 of Darlington transistor 62, thereby rendering Darlington transistor 62 conductive to complete the collector-emitter circuit 66-68 to ground in shunt of the armature of motor M. Thus, continued rotation of motor M acts as a generator causing current flow from the motor through the collector-emitter path 66-68 to ground to quickly dissipate the energy of the motor and brake it to an "at rest" condition. Shift member engagement means (ball 8 and slide member 6) is restrained in the first shift position (solid lines) by the shift member 16, thereby compressing spring 10 to preload slide 6. Upon removal of torque from the axle drive, shift member 16 releases shift member engagement means 8 and slide 6, permitting spring 10 to drive the slide member 6 to its second shift position corresponding to the second position 14c of reaction member 14. This movement pivots shift member 16 about the pivot 18 to effect a shift of the two speed axle shift mechanism.

Figure 3A:
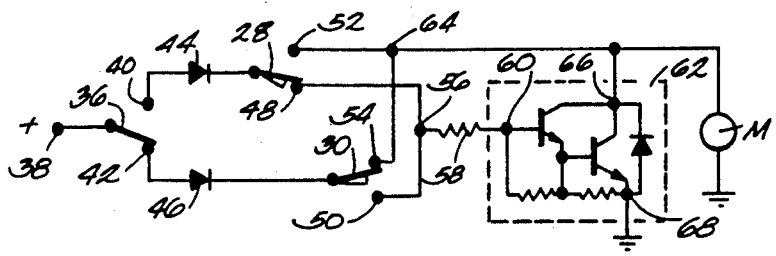
FIGS. 3A-3C are schematic views showing sequential switch operations as in FIGS. 2A-2C in moving the shift member engagement means to a first shift position.
Figure 3B:
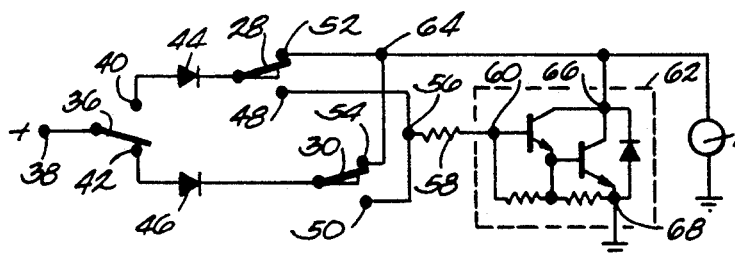
Figure 3C:
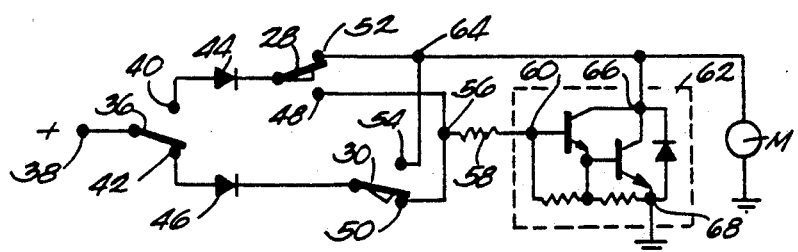

When it is desired to shift the axle back to the first of the two shift positions, selector switch 36 is moved to the second condition as shown in FIG. 3A wherein a circuit is completed from the positive terminal 38 through selector switch 36 and output terminal 42 thereof, through diode 46 to the common terminal of position sensing switch 30 and its second condition output terminal 54 to start motor M rotating. In the initial increment of clockwise rotary movement of rotatable wheel 22, the ramp of slot 22a drives push pin 32 upward to operate position sensing switch 28 to its second condition as shown in FIG. 3B. This switching action has no affect on the circuit inasmuch as power is not supplied to switch 28 from the selector switch 36. Rotary movement of wheel 22 drives pin 26 from the left-hand, second rotational position 26a to the solid line position as shown in FIG. 1. This movement drives reaction member 14 to its first (right-hand) shift position shown in solid lines in FIG. 1 while slide member 6 and shift member engagement means 8 is held in the left-hand, second shift position (shown in dotted lines) by the shift member 16. When wheel 22 rotates 180° such that the pin 26 arrives at the solid line position as shown in FIG. 1, slot 22a moves under push pin 34, allowing position sensing switch 30 to move to its first condition, opening the circuit to the motor. In the first condition, switch 30 completes a circuit from positive terminal 38 through selector switch 36, output terminal 42 thereof, diode 46, selector switch 30 and first condition output terminal 50 to apply power to the gate 60 of Darlington transistor 62, thereby rendering it conductive and completing the collector-emitter circuit 66-68 thereof to permit motor M to dissipate energy therethrough and dynamically brake the motor. Again, as torque on the mechanical drive of the axle is released, the shift member 16 is released and spring 10 drives slide member 6 and shift member engagement means 8 to the right-hand first position shown in solid lines in FIG. 1, pivoting shift member 16 about pivot 18 and shifting the axle shift mechanism to its first shift position.

In the event the operator of the vehicle moves the selector switch 36 to its first condition, starting motor M to drive rotatable member 22 to its second rotational position, and thereafter operates the selector switch 36 to the second condition during the running of motor M, the motor will be maintained running through the selector switch 30 which is operated to its second condition completing a circuit through its output terminal 54 to the motor M. When the wheel reaches the first 180° of travel and slot 22a permits switch 28 to be returned to its first condition, the switching operation of position sensing switch 28 will have no affect on the control of the motor and the motor will continue to run until it travels 360° back to its original starting position shown in solid lines in FIG. 1. At this point, slot 22a will permit switch 30 to move to its first condition, disconnecting the motor M from the power supply and completing a circuit through the output terminal 50 of switch 30 to the gate 60 of Darlington transistor 62 to complete the energy dissipating emitter-collector circuit therethrough. A similar sequence of events permits the motor M to run 360° when the operator moves the selector switch 36 to its second operating condition, completing a circuit through output terminal 42 to the position sensing switch 30 as shown in FIG. 3A and, after the motor starts driving rotatable member 22, the operator switches the selector switch 36 back to the first condition. In so doing, the circuit for motor M is maintained through the position sensing switch 28 and output terminal 52 thereof until such time as the switch 28 is permitted to return to the first condition thereof by the slot 22a and cam follower pin 32. In the first condition of position sensing switch 28, power is disconnected from the motor M and applied to the gate 60 of Darlington transistor 62 to energize the transistor in shunt of the motor armature.

The foregoing has described preferred embodiments of an electrical control for a shift actuator wherein a motor driving a rotatable member for effecting a shifting operation is dynamically braked to an "at rest" position by a pair of position sensing switches operating in a predetermined sequence to electrically connect and disconnect a dynamic braking circuit with the motor. A solid state switch is employed as a switching means responsive to the position sensing switches to connect and disconnect to the dynamic braking circuit. A clamping diode integral with the particular Darlington solid state switch operates to significantly reduce EMI levels for the control The control prevents the dynamic braking circuit from being connected to the motor while a "run" signal is applied to the motor. It is to be understood that the foregoing embodiments are susceptible to various modifications and changes without departing from the scope of the appended claims.

I claim:

1. An electrically controlled shift actuator comprising:
   shift member engagement means movable between first and second shift position;
   a rotatable member having first and second rotational positions;
   means for moving said first member engagement means to said first and second shift positions in response to rotation of said rotatable member respectively to said first and second rotaional positions;
   a motor operable to rotate said rotatable member;
   energy dissipating means connectable to said motor for dynamically braking said motor, said energy dissipating means comprising electrically energized switch means for selectively connecting and disconnecting said energy dissipating means to said motor;
   first and second position sensing switch means for sensing a respective rotational position of said rotatable member, each said position sensing switch means having first and second conditions, respectively, each said position sensing switch means connected to said motor in respective said second conditions thereof and to said electrically energized switch means in respective said first conditions thereof;
   selector switch means connected to each said position sensing switch means and to a power supply for selectively alternatively connecting one of said first and said second position sensing switch means to said power supply; and
   means associated with said rotatable member for
   a) effecting said second condition of said first position sensing switch means and said first condition of said second position sensing switch means in said first rotational position of said rotatable member and said first shift position of said shift member engagement means to connect said motor to said power supply through said selector switch means and said first position sensing switch means,
   b) changing said second position sensing switch means to said second condition as said motor rotates said rotatable member toward said second rotational position,
   c) changing said first position sensing switch means to said first condition at said second rotational position of said rotatable member to disconnect power from said motor and to connect power to said electrically energizable switch means, thereby connecting said energy dissipating means to said motor,
   d) connecting said motor to said power supply through said second position sensing switch means upon changing said selector switch means to an alternative condition when said shift member engagement means is in said second shift position, disconnecting power from said electrically energizable switch means, thereby disconnecting said energy dissipating means from said motor,
   e) changing said first position sensing switch means to said second condition as said motor rotates said rotatable member toward said first rotational position,
   f) changing said second position sensing switch means to said first condition at said first rotational position of said rotatable member to disconnect power from said motor and to connect power to said electrically energizable switch means, connecting said energy dissipating means to said motor, wherein simultaneous application of power to said motor and said electrically energizable switch means is prevented.

2. The electrically controlled shift actuator defined in claim 1 further comprising a unidirectional diode connected to said motor for dissipating inductive energy of said motor when electric power is initially removed from said motor.

3. The electrically controlled shift actuator defined in claim 1 wherein said electrically energizable switch means comprises solid state switch means.

4. The electrically controlled shift actuator defined in claim 1 wherein said electrically energizable switch means comprises transistor means.

5. The electrically controlled shift actuator defined in claim 1 wherein said electrically energizable switch means comprises a Darlington transistor.

6. A control for controlling a shift actuator for selectively moving a shift member engagement means between a selected one of at least two shift positions, said shift actuator comprising said shift member engagement means, a rotatable member having at least two predetermined rotational positions, means responsive to rotation of said rotatable member for moving said shift member engagement means to one of said shift positions corresponding to one of said predetermined rotational positions of said rotatable member, and a motor operable to rotate said rotatable member, said control comprising:
   energy dissipating means connectable to said motor for dynamically braking said motor, said energy dissipating means comprising electrically energizable switch means for selectively connecting and disconnecting said energy dissipating means to said motor;
   a pair of position sensing switch means for sensing a respective said predetermined rotational position of said rotatable member, each of said pair of position sensing switch means having two operative conditions, respectively, each of said pair of position sensing switch means connected to said motor in a respective one of said operative conditions and connected to said electrically energizable switch means in an other of said operative conditions;

selector switch means connected to each said position sensing switch means and to a power supply for selectively alternatively connecting one of said position sensing switch means to said power supply; and means associated with said rotatable member for
 a) effecting operation of one of said pair of position sensing switch means to one of said operative conditions and an other of said pair of position sensing switch means to an other of said operative conditions in one of said predetermined rotational positions of said rotatable member and corresponding one of said shift positions of said shift member engagement means to connect said motor to said power supply through said selector switch means and said one of said position sensing switch means and to disconnect said electrically engagable switch means from said power supply,
 b) effecting operation of said other of said position sensing switch means during movement of said rotatable means from one said predetermined rotational position to an other thereof,
 c) effecting operation of said one of said pair of position sensing switch means to said other of said operative conditions at said other predetermined rotational position of said rotatable member to disconnect power from said motor and connect power to said electrically energizable switch means to connect said energy dissipating means to said motor, thereby preventing simultaneous application of power to said motor and said energy dissipating means.

7. The control for controlling a shift actuator defined in claim 6 further comprising a unidirectional diode connected to said motor for dissipating inductive energy of said motor when electric power is initially removed from said motor.

8. The control for controlling a shift actuator defined in claim 6 wherein said electrically energizable switch means comprises solid state switch means.

9. The control for controlling a shift actuator defined in claim 6 wherein said electrically energizable switch means comprises transistor means.

10. The control for controlling a shift actuator defined in claim 6 wherein said electrically energizable switch means comprises a Darlington transistor.

* * * * *